United States Patent [19]

Miserlis et al.

[11] 4,182,801
[45] Jan. 8, 1980

[54] METHOD OF DRYING LIQUID OLEFIN MONOMER FEED IN A MOLECULAR SIEVE DRYER IN THE POLYMERIZATION OF OLEFINS FROM LIQUID OLEFIN MONOMER

[75] Inventors: Constantine D. Miserlis, Arlington; Peter J. Lewis, Andover, both of Mass.

[73] Assignee: The Badger Company, Inc., Cambridge, Mass.

[21] Appl. No.: 870,117

[22] Filed: Jan. 17, 1978

Related U.S. Application Data

[63] Continuation-in-part of Ser. No. 728,074, Sep. 30, 1976, abandoned.

[51] Int. Cl.$^2$ .......................... C08F 4/66; C08F 10/00
[52] U.S. Cl. .......................................... 526/77; 526/68
[58] Field of Search .................................... 526/68, 77

[56] References Cited

U.S. PATENT DOCUMENTS

| 3,309,350 | 3/1967 | Kelley et al. | 526/68 |
| 3,362,940 | 1/1968 | Edwards et al. | 526/68 |
| 3,565,873 | 2/1971 | Sutherland, Jr. et al. | 526/68 |
| 3,635,931 | 1/1972 | Davison | 526/68 |
| 4,068,053 | 1/1978 | Miserlis et al. | 526/68 |
| 4,068,060 | 1/1978 | Miserlis et al. | 526/77 |

FOREIGN PATENT DOCUMENTS 828830  2/1960  United Kingdom ............ 526/77

OTHER PUBLICATIONS

Kirk–Othmer, Encyclopedia of Chemical Technology, vol. 7, pp. 393–394, J. Wiley and Sons, Inc. (New York) 1965.

Primary Examiner—Edward J. Smith
Attorney, Agent, or Firm—Sewall P. Bronstein

[57] ABSTRACT

In the catalytic polymerization of olefins from liquid olefin monomer under positive pressure, the use of a fuel gas, required in any event for providing energy elsewhere in the system, as a regenerative drying gas to regenerate the beds of a molecular sieve dryer used to dry the liquid olefin to be polymerized.

6 Claims, 2 Drawing Figures

METHOD OF DRYING LIQUID OLEFIN MONOMER FEED IN A MOLECULAR SIEVE DRYER IN THE POLYMERIZATION OF OLEFINS FROM LIQUID OLEFIN MONOMER

This application is a continuation-in-part of U.S. Ser. No. 728,074 filed Sept. 30, 1976, now abandoned.

THE PROBLEM

In the liquid phase catalytic polymerization under positive pressure of olefins to polyolefins such as polyethylene, polypropylene, polybutylene, etc. in which the reaction mass comprises polyolefin dissolved in liquid monomer which is recovered by flashing it off the polymer as a vapor which is liquified and recycled, the catalysts conventionally used, e.g., Ziegler catalyst, are highly sensitive to the presence of even small amounts of water. Accordingly it is essential that water be removed from the liquid olefin to reduce its water content down to 5–10 ppm or less. This is conventionally done by first stripping water from the liquid olefin feed by means of a stripping tower, e.g., a countercurrent flow packed tower, to reduce the water content to 10 to 20 ppm followed by removing more water down to 5–10 ppm or less by means of a conventional molecular sieve dryer (MSD). The MSD is provided with a plurality (usually two) of beds of granular, water-adsorbing (adsorbing is used herein to mean absorbing and/or adsorbing either physically or chemically) material, such as that sold by Union Carbide Corporation under the trade name 3X. Each bed has heating means (either heating coils using heating fluid or electrical heating elements) therein.

The flow of liquid monomer is cyclically switched by switching valves from one bed to the other. While one of the beds is on-stream, during which water is removed from the liquid monomer and is adsorbed by the granular material of the bed, the other off-stream bed is regenerated by the heating element or elements, which volatilize the water adsorbed thereby during its previous on-stream cycle. Part of the exit flow of dried liquid monomer from the on-stream bed is diverted and volatilized to a gas which is flowed through the off-stream bed to remove the evaporated water therefrom and thereby regenerate the bed to prepare it for the next on-stream cycle. The diverted volatilized liquid monomer is sometimes referred to as the regenerating or carrier or drying gas. The diverted monomer is recovered, i.e., the water is removed therefrom, by special condensation equipment and blended back into the recycle system.

This procedure has serious disadvantages as follows:

1. The capacity of the equipment must be increased to handle the diverted monomer, which increases recycle, thereby requiring increased capacity to handle the increased recycle. This increases the cost.
2. The special condensation equipment and energy required to remove water from the diverted monomer adds to the cost and power requirements of the plant.
3. The cost of compressing the substantial amount of diverted monomer for recycle adds substantially to the cost and power requirements.

BRIEF DESCRIPTION OF THE INVENTION

According to the present invention, these aforesaid problems are eliminated by using as a regenerating gas for the MSD bed, the fuel gas which is required in any event to provide energy elsewhere in the system, such as petroleum gas, propane, butane, heptane, city gas, etc. The MSD bed is not pretreated with steam, or water in any form, since such pretreatment would deleteriously affect the reaction unless such water is removed which would substantially increase the cost. No such pretreatment is necessary when regenerating the MSD bed in accord with the teachings of the present invention.

It has been found that even though the fuel gas is a foreign substance introduced into the system, residual amounts of which may be picked up by the liquid monomer subsequently flowed through the regenerated bed to the reactor, and even though the catalyst is highly sensitive to foreign substances, polymerization of the liquid monomer subsequently flowed through the regenerated bed is not deleteriously affected.

Since the fuel gas leaves the bed being regenerated at an elevated temperature, it is effectively preheated for flow to burners elsewhere in the plant thereby reducing total plant energy requirements.

The flow rate of regenerating fuel gas through the off-stream bed is sufficient to dry the bed within the prescribed period of time during which the other bed is on-stream and varies in direct proportion to the number of beds used in the cycle. Two beds are usually used and for a two bed MSD, a preferred rate of flow is between 5000 and 10,000 SCFH (standard cubic feet per hour).

Preferably the fuel gas is one with between about 750 and 1500 BTU per standard cubic foot.

By the use of fuel gas as a regenerating gas for the MSD as compared to the use of a diverted flow of dry monomer, fuel savings of as high as 1,000,000 BTU per year for a 25,000,000 lbs. polyolefin per year plant may be realized with a financial savings of more than $25,000 per year.

The term "Ziegler catalyst," as used herein, has the meaning as defined in the eighth edition of The Condensed Chemical Dictionary, which is:

"A type of stereospecific catalyst, usually a chemical complex derived from a transition metal halide and a metal hydride or a metal alkyl, The transition metal may be any of those in groups IV to VIII of the periodic table; the hydride or alkyl metals are those of groups I, II and III. Typically, Titanium chloride is added to aluminum alkyl in a hydrocarbon solvent to form a dispersion or precipitate of the catalyst complex. These catalysts usually operate at atmospheric pressure and are used to convert ethylene to linear polyethylene, and also in stereospecific polymerization of propylene to crystalline polypropylene (Ziegler process)."

One of its characteristics is that it is highly sensitive to poisoning by water as steam or in any other form, and consequently it is necessary to ensure that the water content of the feed to the reactor chamber be reduced to a minimum by the stripper and MSD consistent with economics.

DESCRIPTION OF THE DRAWINGS

The advantages of the invention will be further understood by the following drawings and detailed description thereof in which drawings

DETAILED DESCRIPTION OF THE INVENTION

Figure 1:
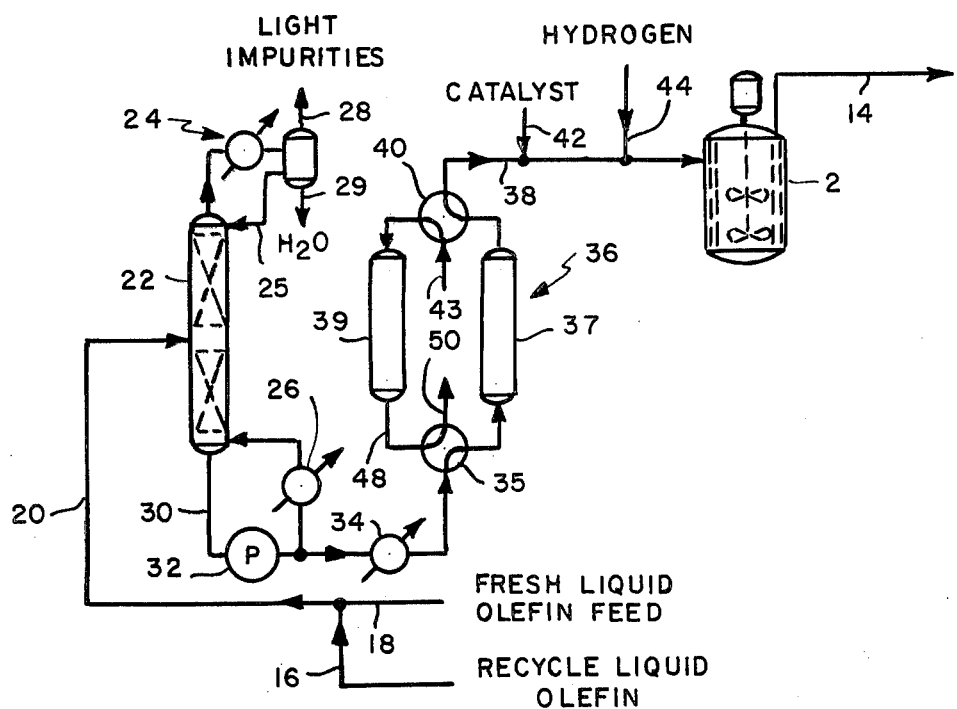
FIG. 1 is a schematic flow sheet of a method embodying the present invention.

With reference to the figures, 2 represents a conventional catalytic polyolefin polymerization reactor having a pump-around cooler (not shown).

In conventional methods of catalytically polymerizing olefins from liquid olefins under pressure, the effluent 14 (olefin polymer dissolved in liquid monomer) from reactor 2 is quenched with water to stop further polymerization followed by settling out the heavier water from the polymer and monomer reaction mass followed by separating the liquid monomer from the polymer by flashing it off from the polymer, and recycling the flashed monomer vapor. The separated polymer is extruded, cooled and pelletized. These subsequent operations after the reactor 2 are not shown in the drawings.

The recycled olefin monomer 16 under sufficient positive pressure to maintain it in a liquid state, is admixed with fresh olefin monomer feed 18, also under positive pressure sufficient to maintain it is a liquid state, and the liquid mixture is passed through line 20 to a conventional stripping and drying column 22 with conventional reflux condenser 24 and reboiler 26. Light volatile impurities and water (the water content of the liquid olefin is reduced to 10–20 ppm) are stripped from the liquid monomer in stripper column 22 and leave the reflux condenser at 28 and 29, respectively, with the condensed liquid monomer being refluxed back to the stripping column. The light volatile impurities come off the top of the condenser 24 at 28 as a vapor. The lighter condensed monomer fraction comes off the condensor 24 as a liquid at 25 and the heavier condensed water fraction comes off as a liquid at 29.

The dried liquid olefin monomer exit 30 from the stripper 22 is pumped by pump 32 through a cooler 34 where its temperature is reduced to well below reaction temperature and thence through a four way switching valve 35 into one of the beds 37 and 39 (in FIG. 1 it is shown passing through bed 37) of a two bed (more than two beds may be used to reduce the time of each cycle) molecular sieve dryer 36, where water is adsorbed from the liquid monomer by the bed to remove it from the monomer to reduce the water content of the monomer to between 5–10 ppm. The dried liquid olefin exit from bed 37 is directed through a second four way switching valve to line 38.

The flow of liquid olefin monomer is switched cyclically from one bed to the other by switching valves 35 and 40. While the monomer is flowing through the on-stream bed (37 in FIG. 1) the off-stream bed (39 in FIG. 1) is regenerated by raising the temperature thereof by heating element 41 (steam coils) shown in FIG. 2, within it to volatilize the water, which the bed adsorbed during its previous on-stream cycle, and by passing a fuel gas 43, required in any event for use in providing energy elsewhere in the polyolefin plant, from a tank (not shown) through switching valve 40 and the heated off-stream bed 39 to remove the volatilized water in the bed through switching valve 35. The water laden fuel gas (referred to as a carrier to regenerating or drying gas) exiting from valve 35 at 50 is directed to burners elsewhere in the plant to provide required energy.

After the on-stream bed 37 approaches its water adsorbing capacity (the time depends on the size of the bed, the rate of monomer flow therethrough and the amount of water in the liquid monomer olefin) valves 35 and 40 are cyclically switched (rotated) to place bed 39 on-stream and bed 37 off-stream and to change the direction of flow of fuel gas to direct it through the off-stream bed 37.

During about the first quarter of each regeneration cycle, the off-stream bed being regenerated is preheated by the heating element within it but the regeneration fuel gas is not passed through it, i.e., when the switching valves 35 and 40 are rotated to place bed 37 off-stream and to place bed 39 on-stream, the flow of fuel gas 43 to the switching valve 40 is halted by a timer valve (not shown) for a period equal to about the first quarter of the regeneration cycle. During this period no gases or fluids are passed through the off-stream bed. Thereafter for the next quarter of the cycle the regenerating gas is passed through the bed while it is still being heated by its heating element. The third quarter of the regeneration cycle is a cooling period to reduce the temperature to about that of the liquid monomer entering the MSD (well below reaction temperature) during the first half of which fuel gas continues to flow therethrough to cool the bed and during the next half of which the flow of fuel gas is halted. The last quarter of the regeneration cycle comprises a safety period to make sure the bed is ready to be switched on-stream.

It is noted that the flow of regenerating gas through the bed during regeneration is in a direction opposite to the flow of liquid monomer during the on-stream cycle.

Each bed of the MSD is conventional and comprises a shell 52 packed with a conventional, synthesized highly water adsorbing granular material, such as that sold under the name 3X by the Union Carbide Corporation. However, any packing which is conventionally used in MSD's can be used in the present invention. The steam heating coils 41 or electrical heating elements conventionally extend through the bed. The beds may be of the same size and number as those used with diverted dried monomer as the regenerating gas for the same plant capacity.

The rate of flow of fuel gas is sufficient to dry the off-stream bed within the prescribed period of time during which the other bed is on-stream, which as aforesaid, varies depending on the number of beds, the size of the beds, the rate of monomer flow therethrough (this depends on the capacity of the plant) and the amount of water in the monomer entering the bed. With a two bed MSD, which is the most usual, and a 8 hour on-stream-off-stream cycle, which is also the most usual, and a liquid monomer having between 10–20 ppm water from the stripping column 22, the rate of flow of fuel gas may range from 5,000 to 10,000 SCFH (standard cubic feet per hour) for a 15,000,000 lb. polyolefin per year plant capacity (with the same number of veds and cycle times, the rate varies in direct proportion to plant capacity.

The fuel gas should be one which has an ignition point well above the regenerating termperature, which may vary between 250° and 350° F.

The dried liquid monomer exiting at 38 from the molecular sieve dryer 36 flows to the reactor 2 in which it is agitated vigorously by a motorized internal agitator. The polymerization catalyst 42 and hydrogen 44 are injected into the liquid monomer slowly during such agitation. Polymerization of the liquid monomer proceeds with a large amount of exothermic heat of reaction which is removed by internal water cooled cooling plates and by a pump around cooler (not shown). The polymer, as it is formed, becomes dissolved in the unreacted liquid monomer with a ratio of polymer to monomer of 10 to 40%, more preferably 15 to 25%, by weight being maintained. The reaction mass of polymer dissolved in monomer is highly viscous.

EXAMPLE

This example is given for a polypropylene plant having a capacity of 15,000,000 pounds of polypropylene per year.

Figure 2:
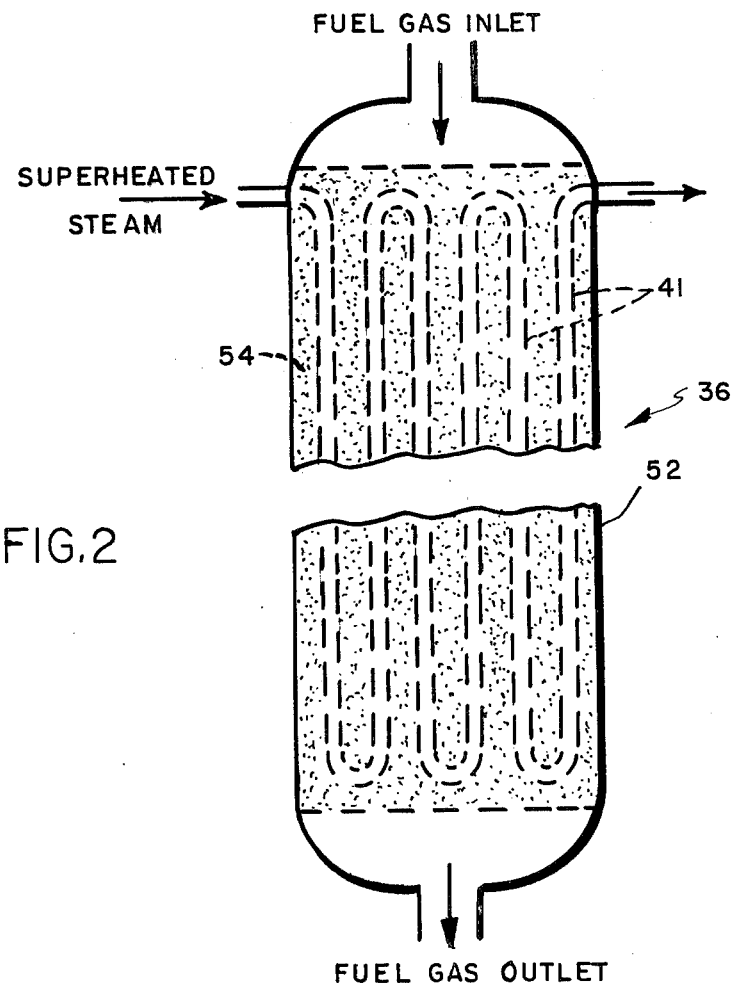
FIG. 2 is an enlarged schematic view in elevation of a bed of the MSD while it is being regenerated.

The temperature, pressure, composition, construction and other properties of the various streams and equipment shown in FIG. 1 are set forth below with reference to the number representing the stream or element of the equipment appearing in FIG. 1.

Stream 18—Fresh liquid propylene feed at a rate of 1880 lbs./hr. and at 70° F. and 600 psig.

Stream 16—Recycle liquid propylene recycled as described above at a ratio of recycle to fresh feed of 5 to 10 (7 is preferred) recycle to one fresh feed at a temp. of 115° F. and a pressure of 600 psig.

Stripper 32—Liquid propylene monomer stripping carried out at 170° F. and 550 psig—reduce moisture to 10-20 ppm.

Cooler 34—Entry to cooler 170° F. and 560 psig. Exit from cooler 100° F. and 550 psig.

Mo. Sieve Dryer—Entry and exit of liquid propylene monomer 100° F.—Entry at 550 psig and exit at 540 psig—regeneration of off-stream dryer at 300° F. and atmospheric pressure.

8 hour on-stream and 8 hour off-stream cycle.

8 hour regeneration cycle.

Reduce moisture to 5-10 ppm.

Rate of flow of regenerating fuel gas 7500 SCFH.

Regenerating fuel gas—propane (1000 BTU per standard cubic foot)

Temp of inlet fuel gas 72° F.

Temp of exit fuel gas 300° F.

Height of each bed—8'

Diameter of each bed—2'6"

(Rate of flow of regenerating fuel gas per cubic foot of bed: 127-255 SCFH)

Heating coil—superheated system—300° F.

Catalyst 42—Conventional Ziegler catalyst 0.5 to 1 lb catalyst per 1000 pounds of fresh monomer feed.

Hydrogen 44—0.05 to 0.15 per 1000 pounds of fresh monomer feed to control polymer chain length Reactor 2—Reactor temp 145° F.

Pressure 450 psig

Completely liquid filled

Vigorous mixing to ensure good mixing of catalyst and $H_2$ with liquid monomer

Stream 14—Polypropylene dissolved in propylene monomer at 145° F. and 450 psig.

It will be understood that with other polyolefins other than polypropylene the pressures must be adjusted to make sure that the olefin monomer is maintained in a liquid state.

The above description and accompanying drawings of a preferred embodiment of the invention are for purposes of illustration only and it is not intended that the invention be limited thereto or thereby but only to the method claimed in the appended claims and their equivalents.

I claim:

1. In a method of catalytically polymerizing olefins from liquid olefin monomer using a Ziegler catalyst and employing a molecular sieve dryer to dry said liquid olefin monomer, said dryer having a plurality of beds of water adsorbing material cyclically switched on and off stream for regeneration of the off-stream bed to remove the water adsorbed thereby during its previous on-stream cycle, and in which the off-stream bed is regenerated by heating the same and flowing a regenerating gas through the heated bed without any steam pretreatment, comprising passing through the off-stream bed as a regenerating gas a fuel gas required in any event for providing energy elsewhere in the system.

2. In a method according to claim 1, said fuel gas being flowed through said off-stream bed at a rate of between 127 to 255 SCFH (standard cubic foot per hour) per cubic foot of bed.

3. In a method according to claim 1, said fuel gas having a heating value of between 750 and 1500 BTU per standard cubic foot.

4. In a method according to claim 1, said fuel gas being selected from the group consisting of petroleum gas, propane, butane, heptane and city gas.

5. In a method according to claim 1, wherein said regeneration is carried out in a plurality of steps comprising preheating said off-stream bed to volatilize moisture therein, followed by flowing said fuel gas through said bed while still heating it, followed by cooling the bed by continued passage of said fuel gas therethrough after heating is discontinued, followed by leaving said off-stream bed off-stream for a period after discontinuing the flow of said fuel gas to permit further cooling thereof.

6. In a method according to claim 1, which includes the step of stripping water from said liquid olefin monomer before passing it to said dryer.

* * * * *